United States Patent [19]

Meguro et al.

[11] Patent Number: 5,472,258
[45] Date of Patent: Dec. 5, 1995

[54] VEHICLE WINDOW ASSEMBLY

[75] Inventors: Yoshiaki Meguro, Utsunomiy, Japan; Junichi Teroaka, Dublin, Ohio; Daniel P. Harless, Amlin, Ohio; Joseph A. Prizzi, Columbus, Ohio

[73] Assignee: Honda Giken Kogyo Kabushiki Kaisha, Tokyo, Japan

[21] Appl. No.: 187,701

[22] Filed: Jan. 27, 1994

[51] Int. Cl.⁶ ..................................................... B60J 1/18
[52] U.S. Cl. ................................. 296/146.9; 296/146.8; 49/462; 52/204.51; 52/716.5
[58] Field of Search ........................... 296/56, 76, 146.8, 296/146.15, 180.1, 201, 152, 49, 52, 146.9; 49/462, 484.1; 428/31; 52/204.51, 204.53, 716.5

[56] References Cited

U.S. PATENT DOCUMENTS

| | | | |
|---|---|---|---|
| 4,243,262 | 1/1981 | Tokunaga et al. | 296/146.15 |
| 4,363,838 | 12/1982 | Schmidt et al. | 52/716.5 X |
| 4,799,730 | 1/1989 | Harasaki | 296/56 X |
| 4,874,201 | 10/1989 | Scaglietti | 296/201 |
| 4,881,773 | 11/1989 | Ichinose | 296/201 X |
| 4,907,838 | 3/1990 | Reaney | 296/202 |
| 4,988,142 | 1/1991 | Chandler et al. | 296/201 X |
| 5,083,832 | 1/1992 | Ohya | 296/201 X |

FOREIGN PATENT DOCUMENTS

| | | | |
|---|---|---|---|
| 247743 | 2/1926 | United Kingdom | 49/484.1 |
| 687458 | 2/1953 | United Kingdom | 49/484.1 |

*Primary Examiner*—Dennis H. Pedder
*Attorney, Agent, or Firm*—Weiner, Carrier & Burt; Joseph P. Carrier; Irving M. Weiner

[57] ABSTRACT

A window assembly for a vehicle body is disclosed which comprises a side window pane having a peripheral edge surface, a rear window pane having a peripheral edge surface, the peripheral edge of the rear window pane being disposed adjacent the peripheral edge of the side window pane in an operative position of the rear window pane, a first molding strip mounted along at least a portion of the peripheral edge surface of the side window pane, a second molding strip mounted along at least a portion of the peripheral edge surface of the rear window pane, support structure for supporting at least the side window pane on the vehicle body, and the first and second molding strips being configured to conceal the support structure from being viewed outwardly of the vehicle and to provide an appearance of a continuous outer surface from the side window pane to the rear window pane. Preferably the outer surface of the second molding strip will be spaced inwardly toward the vehicle a small distance from an imaginary extension of the outer surface of the first molding strip, and inner surfaces of the first and second molding strips will define first and second gaps between the molding strips, the second gap extending continuously from and substantially perpendicular to the first gap.

17 Claims, 1 Drawing Sheet

VEHICLE WINDOW ASSEMBLY

BACKGROUND OF THE INVENTION

1. Field of the Invention

The present invention pertains to a vehicle window assembly in which two panes of glass are disposed adjacent each other with a small gap therebetween and a support structure for at least one of the panes is disposed inwardly of a junction between the panes so as to be concealed thereby. More particularly, the present invention pertains to such a vehicle window assembly in which molding associated with the adjacent edges of the glass panes is configured to reduce wind noise which may generated by the window assembly as the vehicle is traveling, and to restrict visibility through the gap at the junction of the adjacent glass panes.

2. Description of Relevant Art

Current automotive designs concentrate on improving aerodynamic efficiency and aesthetic appearance. This has resulted in flush or near flush interfaces between the glass panes and the supporting structure, typically pillar-type supporting structures, therefore. Further development has led to the concealment of window pillars behind the exterior glass panes to provide a smooth junction between two separate pieces of glass and give the favorable appearance of a substantially continuous glass surface.

Strict manufacturing tolerances must be maintained in order for this smooth transition to be aerodynamically and aesthetically effective.

U.S. Pat. No. 4,243,262, for example, proposes a window assembly wherein a rear window pane, formed as part of a tailgate is hingedly attached to the car body such that it extends at approximately a 30° angle to horizontal when it is in a closed position. Opposite side edges of the rear window pane lie adjacent to upper edges, respectively, of side corner windows along the supporting C pillars in such a manner that the C pillars are disposed inwardly behind the adjacent portions of the rear window pane and the side corner windows. A minimum gap between each of the side corner windows and the rear window pane must be ensured to allow for tolerances in the movement of the hinged rear window as well as for the tolerances in fabrication and mounting of the windows so that the rear pane is not damaged. The window structure of U.S. Pat. No. 4,243,262 does not include edge molding applied to either the rear pane or the side corner windows to conceal the C pillars from view through the gaps between the rear pane and the side corner windows, respectively. These gaps may increase in size due to the manufacturing tolerances so that the "hidden" C pillars may be readily viewed from the outside of the vehicle through the gaps. This detracts from the aesthetic appearance of the vehicle.

Another known vehicle window assembly is disclosed in U.S. Pat. No. 5,083,832. The known window assembly disclosed in this patent includes a molding assembly specifically designed for a junction between the side door window and the windshield of an automobile. The window assembly, including the molding, prevents viewing of the supporting door sash structure through the glass panes by persons-standing outside of the vehicle. The molding strip assembly according to this patent includes a protruding flange provided on the molding strip attached to the side door window such that the flange protrudes significantly into the air flow path from the windshield to the side door window. An undesirable increase in wind noise would result if such molding assembly were used at any window junctions on a vehicle besides the junction between the windshield and side window for which it was designed, due to the projecting flange.

The present invention has been developed to overcome the problems and disadvantages associated with known vehicle window assemblies, including those discussed above, and to fulfill a need in the art for a window molding structure which allows for an aerodynamically and aesthetically favorable design approach at substantially any window junction on a vehicle.

SUMMARY OF THE INVENTION

According to the invention there is provided a window assembly for a vehicle body comprising a first window pane having a peripheral edge surface, a second window pane having a peripheral edge surface, the peripheral edge surface of the second window pane being disposed adjacent the peripheral edge of the first window pane in an operative position of the second window pane, a first molding strip extending along at least a portion of the peripheral edge of the first window pane, a second molding strip extending along at least a portion of the peripheral edge of the second window pane, means for supporting the first window pane on the vehicle body, and interface means on each of the first and second molding strips for concealing the supporting means from being viewed outwardly of the vehicle and for providing an appearance of a continuous outer surface from the first window pane to the second window pane.

Preferably the interface means defines first and second gaps between the first and second molding strips, the second gap extending continuously from and perpendicular to the first gap; while the first gap is preferably inclined at an angle directed downstream relative to the outer surfaces of the first and second window panes in the direction of air flow from the first pane to the second pane.

It is also preferred that the interface means further includes an outer surface on each of the first and second molding strips, that the first molding strip is disposed forwardly of the second molding strip on the vehicle body, that the outer surface of the first molding strip lies on an envelope of curvature, and that the outer surface of the second molding strip is spaced inwardly from the envelope by a small distance.

It is an object of the invention to provide a vehicle window assembly, including molding and two adjacent, though non-engaging, panes of glass, that generates very little wind noise as the vehicle is traveling and which restricts visibility of underlying support structure through the junction of the adjacent panes.

It is another object of the invention to provide such a molding assembly which is simple in structure, relatively compact and economical to manufacture.

It is still another object of the invention to provide such a window molding assembly which may be used in relation to any adjacent pair of windows on a vehicle.

It is yet another object of the invention to provide such a vehicle window assembly which gives the favorable appearance of having a continuous outer surface.

Other objects, advantages and salient features of the present invention will become apparent from the following detailed description, which, when taken into conjunction with the annexed drawings discloses a preferred embodiment of the present invention.

DETAILED DESCRIPTION OF THE PREFERRED EMBODIMENT

Figure 1:
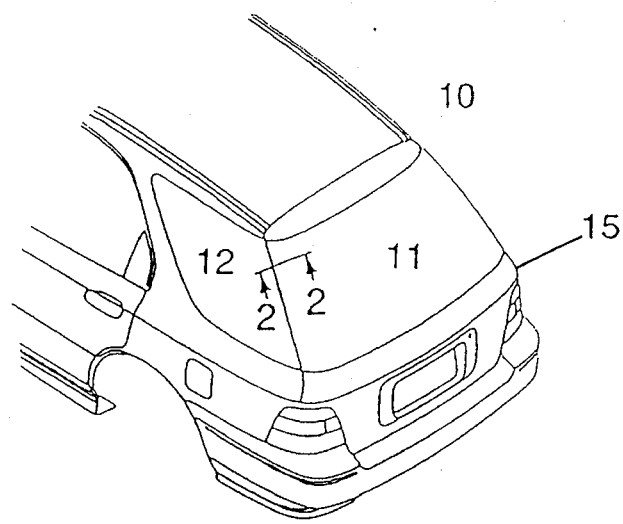
FIG. 1 is a rear perspective view a vehicle body including a window assembly according to a preferred embodiment of the invention.

Referring to FIG. 1, there is depicted a rear perspective view of a vehicle body 10 including a window assembly according to a preferred embodiment of the invention. The vehicle body 10 includes a hinged tailgate 15, a rear window pane 11 attached to the tailgate and which pivots with the tailgate between open and closed positions, and a side window pane 12 which is supported on the vehicle body separately from the hinged tailgate 15. As shown, the rearmost peripheral edge of the side window 12 is disposed adjacent the left side edge of the rear window 11 when the tailgate 15 is in its closed position such that a smooth junction is established between the windows 11, 12 to give the appearance that the windows 11, 12 are a continuous glass surface.

Figure 2:
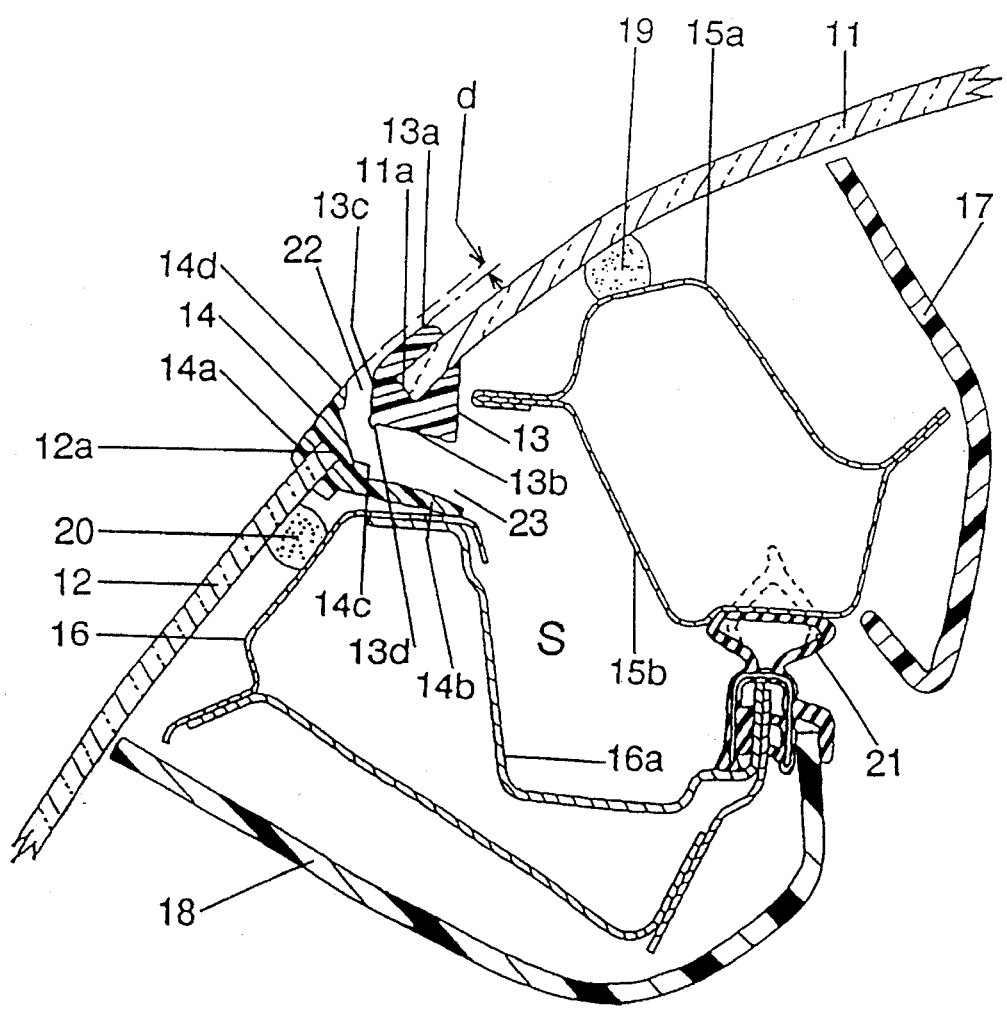
FIG. 2 s an enlarged cross-sectional view taken along line 2—2 in FIG. 1.

Details of the window assembly are shown in FIG. 2. The side window pane 12 is mounted in an opening defined in a rear portion of a side of the vehicle body 10, while similarly the rear window pane is mounted in an opening defined in tailgate 15. More particularly, the vehicle body 10 includes a support structure for the side window pane 12, including a D pillar 16 disposed inwardly of the vehicle body's outer surface, and the inner surface of a peripheral edge of the window pane 12 is fixed to one face of the D pillar 16 with an adhesive sealer 20 or the like. Similarly, the rear window pane 11 is mounted in an opening of the tailgate 15, which opening is partially defined by a tailgate pillar 15a using an adhesive sealer 19 or the like disposed between the inner surface of a peripheral edge, the glass pane 11 and a surface of the tailgate 15a. Opposing faces 16a, 15b of the pillars 16, 15a, respectively define an enclosed space S therebetween for water drainage, and an elastomeric seal 21 seals the interface between the pillars 15a, 16. The solid line in FIG. 2 shows the seal 21 in a partially compressed state when the tailgate 15 is in its closed position, while the dotted line in FIG. 2 shows the seal 21 in a non-compressed condition as it would be when the tailgate is open.

A first elastomeric molding strip 13 extends along at least a portion of the left side peripheral edge 11a of the rear window pane 11, and a second elastomeric molding strip 14 extends along at least a portion of a rear peripheral edge 12a of the side window pane 12. As shown, the molding strips 13, 14 are preferably formed from a dark, solid elastomeric material such as a black rubber or the like and are fixed to the peripheral edges 11a, 12a of the window panes, respectively. Most preferably, the molding strips 13, 14 will be molded directly onto the peripheral edges of the window panes so that they will be very compact and aerodynamic, and will generate little or no wind noise.

Interior molding pieces 17, 18 are mounted on or near inner portions of the tailgate pillar 15a and D pillar 16, respectively, for concealing the pillars from view of persons within the vehicle, while the window panes 11, 12 will also preferably include black masking or the like on inner surfaces thereof extending from the peripheral edges 11a, 12a to positions near the interior molding pieces 17, 18 to assist in concealing the pillars 15a, 16 from view by persons outside of the vehicle.

According to a primary aspect of the present invention, the cross-sectional shape of the molding strips 13, 14 is configured such that the relatively large space S between the pillars 15a, 16 is not visible by persons outside of the vehicle when the tailgate 15 is in its closed position. As depicted, this is preferably achieved by configuring the molding strips 13, 14 to define a pair of gaps 22, 23 therebetween, the second gap extending continuously from and substantially perpendicularly to the first gap 22. Particularly, two inner surfaces 13b, 13c of the first molding strip 13 which face the second molding strip 14 and extend substantially perpendicular to each other, while similarly the second molding strip 14 includes a projecting leg 14b which faces and extends substantially parallel to the face 13b and an inner face 14c of the strip 14 faces and extends substantially parallel to the face 13c, whereby the faces 13c, 14c define the first gap 22 and the face 13b together with the projecting leg 14b define the second gap 23.

As shown in FIG. 2, the first gap 22 is preferably narrower than the second gap 23, while the faces 13c, 14c of the molding strips will preferably extend at a slight angle to each other, such as 10°–35°, rather than being truly parallel to each other. Such configuration gives a desirable perception of a very shallow channel between the two glass panes 11, 12 to persons standing outside of the vehicle because such persons' line of sight through the narrow first gap 22 extends only as far as the intersection between the surface 14c and the projecting leg 14b of the second molding strip. The actual distance between the outer surfaces of the glass panes 11, 12 and the innermost surface of the D pillar 16, may be 70–100 mm. The shallow channel perception is further enhanced by a projection 14d formed at an outer portion of the molding strip 14 and projecting into the first gap 22 toward the first molding strip 13, and a projection 13d formed on a lower surface of the first molding strip 13 and projecting into a junction between the first and second gaps 22, 23 toward the second molding strip 14.

According to another important aspect of the invention, the outer surface of the first molding strip 13 is preferably spaced inwardly by a small distance d from a plane, or envelope of curvature, which contains the outer surface 14a of the second molding strip 14. Similarly, the outer surface of the peripheral edge 11a of the rear window pane 11 is spaced inwardly by a small distance from the outer surface of the peripheral edge 12a of the side window pane 12. The distance d is preferably small enough to be unnoticed by the untrained eye, for example 0.5–4.0 mm, and this results in a favorable sense and appearance of continuity between the outer surfaces of the rear and side panes 11, 12.

Additionally, the first gap 22 between the strips 13, 14 is preferably inclined at an angle away from perpendicular directed downstream relative to the outer surfaces 13a, 14a of the molding strips in the direction of air flow, i.e., from the side pane 12 to the rear pane 11. The inclined orientation of the first gap 22 relative to the outer surfaces 13a, 14a, as well as the inwardly spaced nature of the outer surface 13a relative to the outer surface 14a, both desirably function to minimize wind noise around the junction between the two panes 11, 12. This is due, in part, to the elimination of any projections or openings from extending into the air flow path between the two panes.

The tailgate 15 has conventional means (not shown) for adjusting the position of the tailgate 15 relative to the vehicle body 10. The first and second gaps 22, 23 between the molding strips are configured such that any adjustment of the tailgate will be absorbed by the gaps. Hence, the aerodynamic and aesthetic effects of the window assembly will not be eliminated or significantly affected by any normal adjustment made to the tailgate 15.

Although there has been described what is at present considered to be the preferred embodiment of the invention, it will be understood that the invention can be embodied in other specific forms without departing from the spirit or essential characteristics thereof. For example, while the preferred embodiment relates to a junction between a rear tailgate window and a side window the invention is not so limited. Rather, the invention can be applied to any pair of adjacent windows on a vehicle as long as the outwardly disposed molding strip, the second molding strip 14 in the preferred embodiment, is disposed on the peripheral edge of the window which is positioned more forwardly on the vehicle.

The present embodiment is, therefore, to be considered in all aspects as illustrative and not restrictive. The scope of the invention is indicated by the appended claims, rather than by the foregoing description.

I claim:

1. A window assembly for a vehicle body comprising:
   a first window pane having a peripheral edge surface;
   a second window pane having a peripheral edge surface, said peripheral edge surface of said second window pane being disposed adjacent said peripheral edge surface of said first window pane in an operative position of said second window pane;
   a first molding strip extending along at least a portion of the peripheral edge surface of said first window pane;
   a second molding strip extending along at least a portion of the peripheral edge surface of said second window pane;
   means for supporting said first window pane on the vehicle body; and
   interface means on each of said first and second molding strips for concealing the supporting means from being viewed outwardly of the vehicle and for providing an appearance of a continuous outer surface from said first window pane to said second window pane.

2. A window assembly according to claim 1, wherein said interface means defines first and second gaps between said molding strips, said second gap extending continuously from and substantially perpendicular to the first gap.

3. A window assembly according to claim 1, wherein said interface means further includes an outer surface on each of said molding strips, the outer surface of said first molding striping lying on an envelope of curvature, and the outer surface of said second strip is spaced inwardly from said envelope of curvature by a small distance.

4. A window assembly according to claim 3, wherein said distance is within a range of 0.5 mm to 4.0 mm.

5. A window assembly according to claim 3, wherein said distance is within a range of 1.0 mm to 2.0 mm.

6. A window assembly according to claim 2, wherein said first gap extends inwardly from outer surfaces of said molding strips at an acute angle.

7. A window assembly according to claim 6, wherein surfaces of said first and second molding strips defining said first gap are inclined at an angle to each other such that extensions of said surfaces intersect inwardly of the first gap.

8. A window assembly according to claim 2, wherein said first gap is disposed outwardly of said second gap relative to said vehicle body, and said second molding strip includes a projection extending into said first gap.

9. A window assembly according to claim 1, wherein said first window pane is mounted to a side panel of the vehicle body and said second window pane is mounted to a hinged tailgate which is pivotable between opened and closed positions.

10. A window assembly according to claim 1, including means for supporting said second window pane on said vehicle body, and said supporting means for said first window pane and said supporting means for said second window pane defining a substantially closed space therebetween which functions as a water drainage channel, and said interface means also concealing the supporting means for the second window pane from being viewed outwardly of the vehicle.

11. A window assembly according to claim 1, wherein said first and second molding strips are molded onto the peripheral edges of said first and second window panes, respectively.

12. A molding assembly for a pair of adjacent window panes of a vehicle body in which at least one of the window panes is movable relative to the vehicle body and a support structure for at least one of the window panes is disposed inwardly of the vehicle body behind a junction between the window panes, the molding assembly comprising:
    a first molding strip with first mounting means adapted to be mounted to a peripheral edge of one of the adjacent window panes;
    a second molding strip with second mounting means adapted to be mounted to a peripheral edge of the other of said window panes so as to face the first molding strip; and
    interface means on each of said first and second molding strips for concealing the supporting structure from being viewed externally of the vehicle body and for providing an appearance of a continuous outer surface between the pair of adjacent window panes when the molding strips are mounted to the peripheral edges of the window panes.

13. The molding assembly according to claim 12, wherein said interface means are adapted to define first and second gaps between said molding strips when the molding strips are mounted to the window panes, said first gap extending continuously from and substantially perpendicular to said second gap.

14. A molding assembly according to claim 13, wherein surfaces of said first and second molding strips defining said first gap are inclined at an angle to each other such that extensions of said surfaces intersect inwardly of the first gap.

15. A molding assembly according to claim 13, wherein said first molding strip includes a projection, said projection is adapted to project into said first gap when said molding strips are mounted to the peripheral edges of said window pane.

16. A window assembly for a vehicle body comprising:
    a side window pane having a peripheral edge surface;
    a rear window pane having a peripheral edge surface, said rear window pane being disposed adjacent said side window pane in an operative position of said rear window pane;
    a first molding strip mounted along at least a portion of the peripheral edge of said side window pane;
    a second molding strip mounted along at least a portion of the peripheral edge of said rear window pane;
    means for supporting said side window pane on said vehicle body;
    an outer surface of said first molding strip lying on an envelope of curvature and an outer surface of said second molding strip being spaced a small distance inwardly of said envelope of curvature; and
    inner surfaces of said first and second molding strips extending inwardly from the outer surfaces of said molding strips, respectively, define a gap therebetween, said means for supporting being in fluid communication with said outer surface via said gap.

17. A window assembly according to claim 16, wherein said inner surfaces of said molding strips define first and second gaps between said molding strips, said second gap extending continuously from and substantially perpendicular to said first gap.

* * * * *

UNITED STATES PATENT AND TRADEMARK OFFICE
CERTIFICATE OF CORRECTION

PATENT NO. : 5,472,258
DATED : 05 December 1995
INVENTOR(S) : Yoshiaki Meguro, Junichi Teroaka,
Daniel P. Harless, Joseph A. Prizzi It is certified that error appears in the above-indentified patent and that said Letters Patent is hereby corrected as shown below:

Column 1, line 61, between "persons" and "standing" delete the hyphen.
Column 3, line 2, change "FIG. 2 s" to --FIG. 2 is--.

Signed and Sealed this

Nineteenth Day of March, 1996

Attest:

BRUCE LEHMAN

Attesting Officer      *Commissioner of Patents and Trademarks*